US008825375B2

(12) United States Patent  
Huang et al.

(10) Patent No.: US 8,825,375 B2  
(45) Date of Patent: Sep. 2, 2014

(54) SNAP-TO-ROAD USING WIRELESS ACCESS POINT DATA

(75) Inventors: Ronald Keryuan Huang, Milpitas, CA (US); Robert Mayor, Half Moon Bay, CA (US)

(73) Assignee: Apple Inc., Cupertino, CA (US)

(*) Notice: Subject to any disclaimer, the term of this patent is extended or adjusted under 35 U.S.C. 154(b) by 489 days.

(21) Appl. No.: 12/569,790

(22) Filed: Sep. 29, 2009

(65) Prior Publication Data

US 2011/0077862 A1 Mar. 31, 2011

(51) Int. Cl.
*G06F 19/00* (2011.01)
*H04Q 7/20* (2006.01)

(52) U.S. Cl.
USPC ..... 701/412; 455/456.3; 455/457; 455/456.6; 455/3.05

(58) Field of Classification Search
USPC ............... 455/456.3, 456.1, 457, 456.6, 3.05; 701/208, 202, 211, 213, 400, 408, 410, 701/409, 412, 411; 370/328; 340/988
See application file for complete search history.

(56) References Cited

U.S. PATENT DOCUMENTS

| 5,488,559 | A | 1/1996 | Seymour |
| 7,877,203 | B2* | 1/2011 | Mikuriya et al. ............. 701/208 |
| 2006/0178809 | A1 | 8/2006 | Couckuyt et al. |
| 2007/0233367 | A1 | 10/2007 | Chen et al. |
| 2007/0299599 | A1 | 12/2007 | Letchner et al. |
| 2008/0176583 | A1* | 7/2008 | Brachet et al. ............. 455/456.3 |
| 2008/0249713 | A1 | 10/2008 | Sessions |
| 2010/0057359 | A1 | 3/2010 | Caballero et al. |
| 2010/0142447 | A1* | 6/2010 | Schlicht et al. ............... 370/328 |

FOREIGN PATENT DOCUMENTS

GB 2 382 482 A 5/2003

* cited by examiner

*Primary Examiner* — Ronnie Mancho  
(74) *Attorney, Agent, or Firm* — Fish & Richardson P.C.

(57) ABSTRACT

Techniques for performing more accurate snap-to-road calculations using wireless access point data are disclosed. In one aspect, a corrected location corresponding to received location data is selected from a plurality of candidate map locations based on a correspondence between the access points visible to a device and the access points visible at the corrected map location. In another aspect, road vector data is augmented with access point data, and a corrected map location is selected based on a correspondence between the access points visible to the device, and the augmented road vector data.

18 Claims, 8 Drawing Sheets

US 8,825,375 B2

SNAP-TO-ROAD USING WIRELESS ACCESS POINT DATA

TECHNICAL FIELD

This subject matter is generally related to identifying a current location of a device.

BACKGROUND

A device can determine its location by processing location data from various sources (e.g., GPS, WiFi networks, and cellular networks) and identifying a probable map location. Some devices perform a "snap-to-road" calculation where the device automatically selects a map location that is on the most likely road as indicated by the location data. However, these "snap-to-road" calculations are not always accurate due to errors in the location data. This inaccuracy can be frustrating for users of the device. Users viewing their map location on their device may see their map location jump from road to road, as the device displays a different road based on inaccurate location data. Users relying on the device to provide directions from their current location will see the route recalculated as the device selects a different route because of inaccurate location data.

SUMMARY

Techniques for performing more accurate snap-to-road calculations using wireless access point data are disclosed. In one aspect, a corrected map location corresponding to received location data is selected from a number of candidate map locations based on a correspondence between the access points visible to a device and the access points visible at the corrected map location. In another aspect, road vector data is augmented with access point data, and a corrected map location is selected based on a correspondence between the access points visible to the device, and the augmented road vector data.

Particular embodiments of the subject matter described in this specification can be implemented to realize one or more of the following advantages. A more accurate map location of the device can be calculated. Programs that rely on the current map location of the device can be given more accurate information and thus have more accurate output. For example, a direction program can give more accurate directions. A snap-to-road calculation can be performed based only on access point data for wireless access points that are visible to a device.

DESCRIPTION OF DRAWINGS

Like reference numbers and designations in the various drawings indicate like elements.

DETAILED DESCRIPTION

Example Map User Interface

Figure 1:
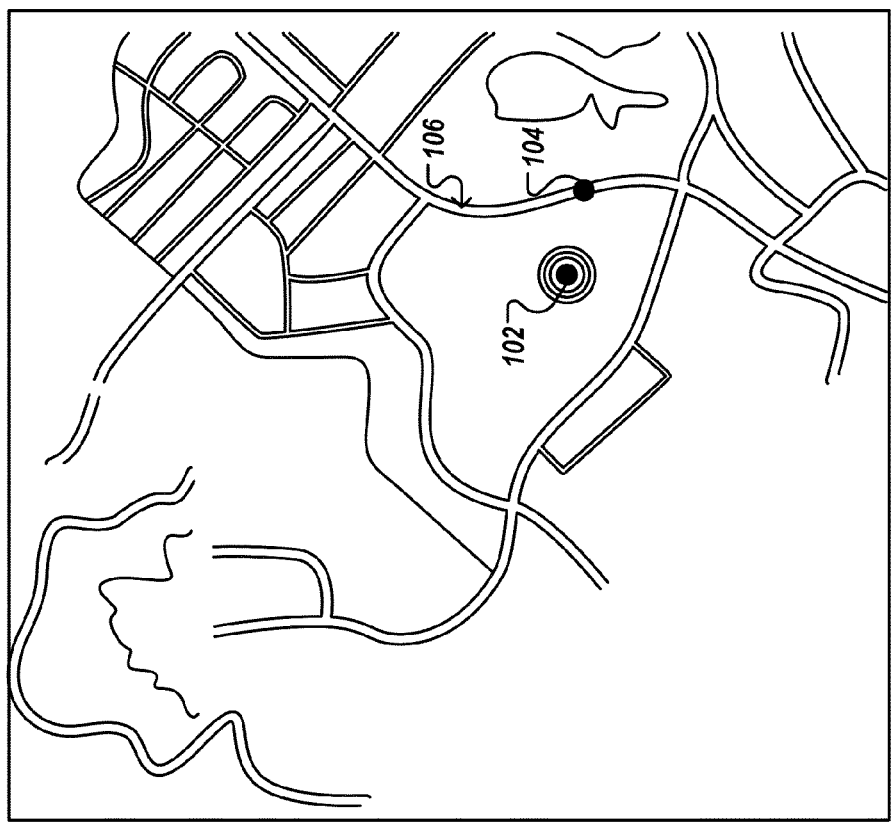
FIG. 1 illustrates an example map user interface showing an estimated map location for a device.

FIG. 1 illustrates an example map user interface 100 showing an estimated location 102 for a device. The device is actually at location 104. The difference between the estimated location 102 and the actual location 104 is the error in the estimated location.

There are several causes of error for position fixes. For example, Global Positioning System (GPS) location estimates are determined using triangulation from satellite signals. Error can occur in the estimated location when a GPS receiver cannot receive signals from enough satellites (either because not enough satellites are visible, or because tall objects, such as buildings, interfere with the signal), or when the geometry of the visible satellites is close together. In addition, effects of the atmosphere, multipath effects, shifts in satellite orbits, and selective availability can each lead to error in GPS-based location estimates. Effects of the atmosphere can include refraction of GPS signals passing through the ionosphere and/or troposphere. Multipath effects can occur when signals take multiple paths to reach the GPS receiver. Selective availability occurs when the signal transmitted by the satellite specifies the incorrect time. Other types of location determination technology can also have similar errors.

The actual location 104 of the device is on a road 106. The term "road," as used herein, is not limited to a paved road that vehicles travel on, but can also include, for example, unpaved roads, hiking trails, rivers, and other set paths that can be traveled in a vehicle, vessel, or on foot. A user is more likely to notice errors in location estimation when the user is on a road but the estimated location 102 is off a road, in part, because while the user may not be sure of their exact position, they are sure that they are on a road, and the estimated location 102 is not on any roads. Many location estimation systems will perform a "snap-to-road" calculation to automatically adjust the estimated location 102 to the most-likely road the device can be on. The most likely road can be determined according to various factors, for example, closeness to the estimated map location, heading direction of the position fix, etc. However, a location on the most likely road is not always the correct location.

Example Map with Access Point Overlay

Figure 2:
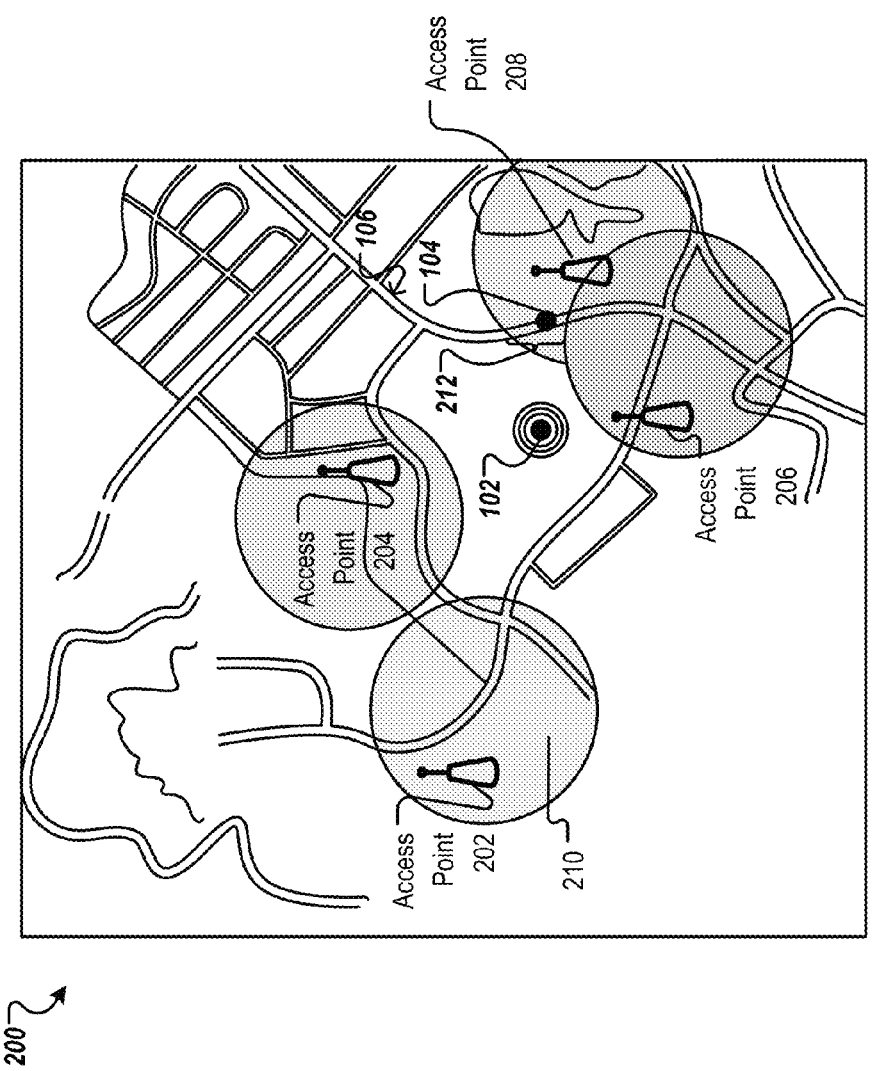
FIG. 2 illustrates an example map with an overlay illustrating visibility of wireless access points.

FIG. 2 illustrates an example map with an overlay illustrating visibility of wireless access points (e.g., access points 202, 204, and 206). The access point data illustrated in FIG. 2 can be used to perform a more accurate snap-to-road calculation.

As illustrated in FIG. 2, access points 202, 204, 206, and 208 are all near the actual location 104 of the device, and the estimated map location 102 of the device. Each access point 202, 204, 206, and 208 has a corresponding area of coverage (e.g., area 210 for access point 202) in which the access point is visible. A database of locations of access points, and optionally a base level signal strength for each access point, is available, for example, from third party providers. This data can be used to generate road access point data that estimates what access points will be visible at various locations along the roads, as well as an estimated signal strength at each location.

At the actual location 104 of the device, only the access point 208 is visible. Therefore, if the snap-to-road calculation takes into account what access points are visible and which access points are not visible, an estimated map location in the region 212 (from where only access point 208 is visible) and on the road 106 will be selected. This estimated map location is close to the actual location 104.

Example Data Sources for Device

Figure 3:
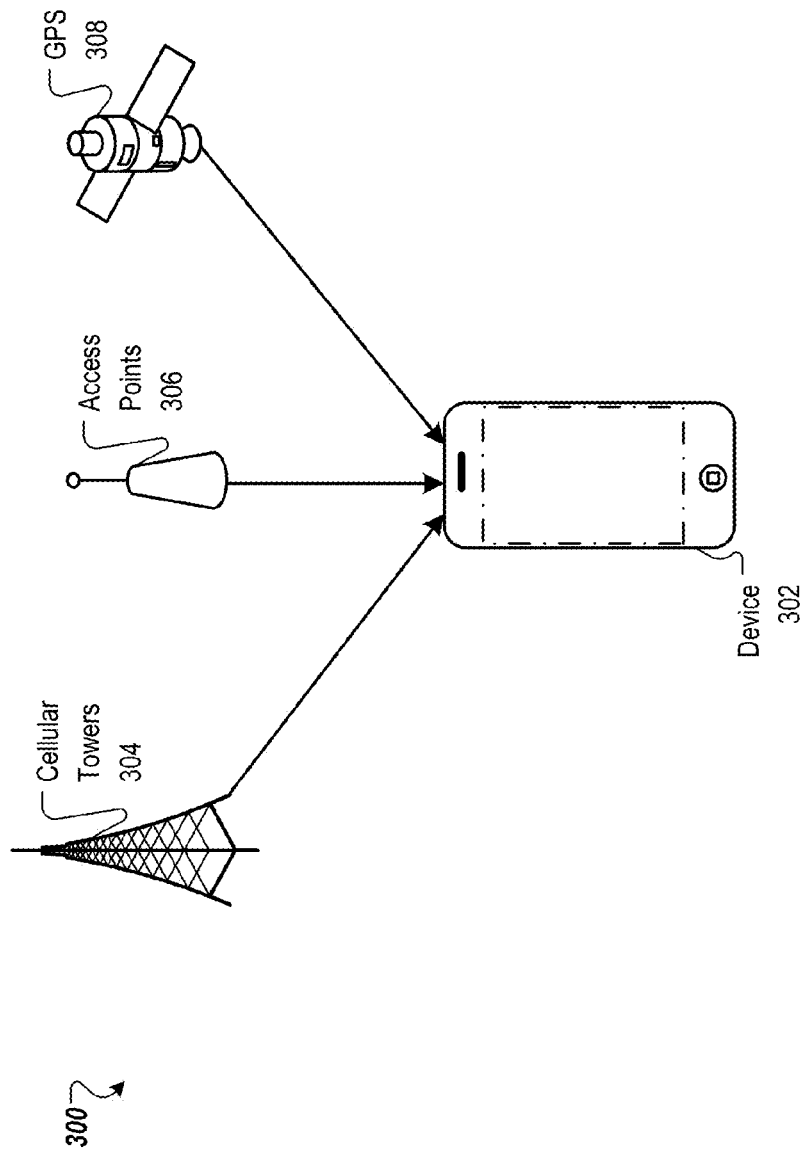
FIG. 3 illustrates an example system showing example sources of location data for a device.

FIG. 3 illustrates an example system 300 showing example sources of location data for a device 302. As illustrated in FIG. 3, the device 302 can receive location data from cellular towers 304, access points 306, and GPS satellites 308. Other sources of location data are also possible. The device can be, for example, a mobile device, a navigation device, or a computer.

The device 302 sends messages to the cellular towers 304 and receives replies from the cellular towers 304. The device 302 can estimate the distance from itself to each cellular tower 304 from the lag time between when the device 302 sends the messages to the cellular towers 304 and when a reply is received from each cellular tower 304. Because the physical location of each cellular tower 304 is known, the device can use triangulation to estimate its position based on the location of the cellular towers 304 and the distances from the cellular towers 304. The cellular towers can further have directional antennas, and the device 302 can further incorporate the direction of the signal from the tower 304 into its calculations.

The device 302 can additionally or alternatively use data received from GPS satellites 308 to estimate its position. The GPS satellites 308 broadcast messages containing the time the message was sent, as well as details about the orbit of the satellites 308. The device 302 estimates the distance to each GPS satellite 308 from the time it took the message to reach the device. The device can then triangulate based on the distance to the satellites 308 and the location of the satellites 308, and estimate the device 302's position.

The device 302 can receive a signal from access points 306. The device 302 can process this signal to generate access point data indicating what access points are visible to the device, and optionally a signal strength for each access point. For example, the access point data can include a Media Access Control (MAC) address and a received signal strength indication (RSSI) for the access point. The access point data can be used to perform an improved snap-to-road calculation, as described below.

Improved Snap-to-Road for Location Data Using Visible Access Points

Device Architecture

Figure 4:
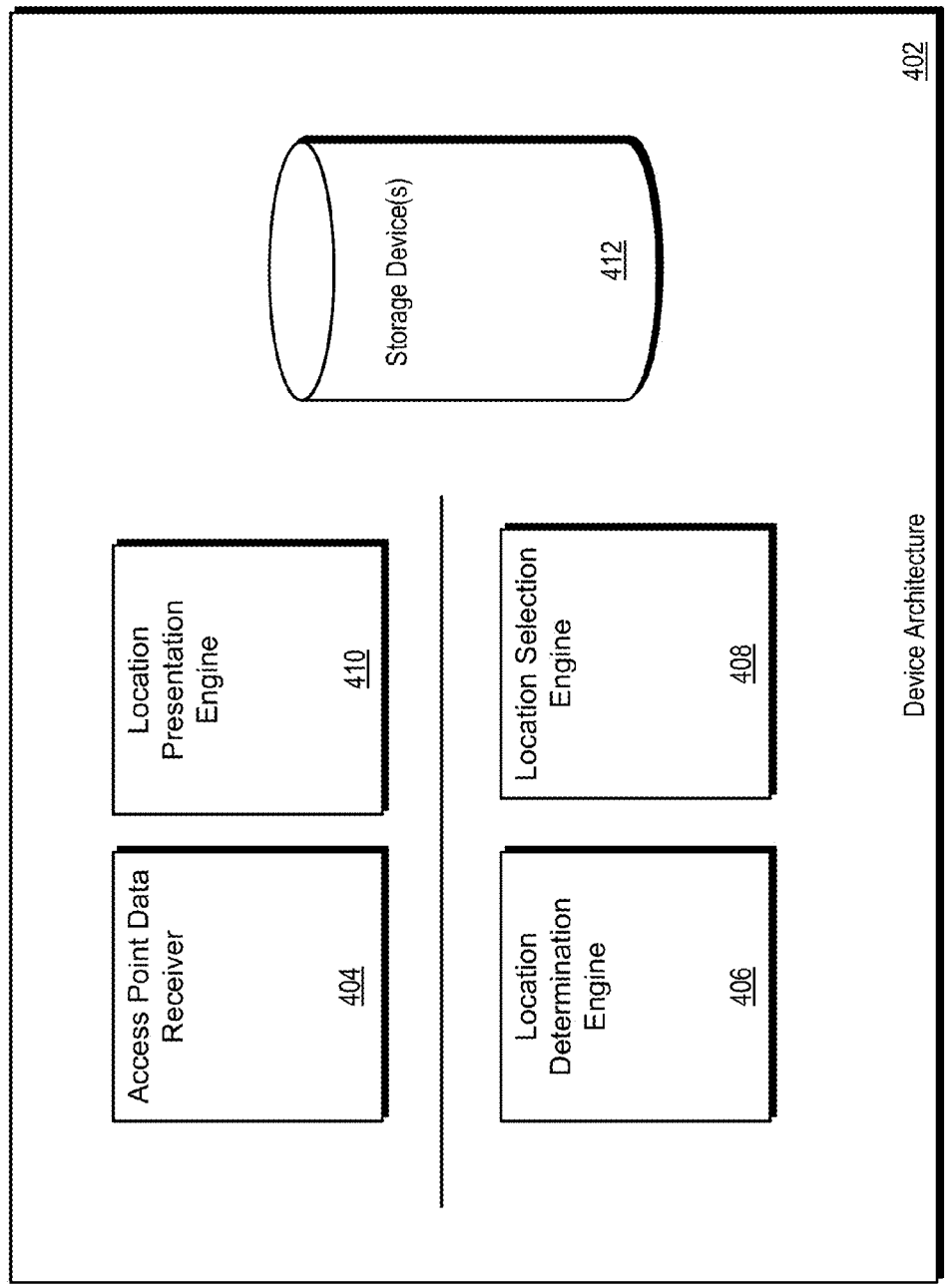
FIG. 4 illustrates an example device architecture for performing snap-to-road determinations for location data based, in part, on visible wireless access points.

FIG. 4 illustrates an example device architecture 402 for performing snap-to-road determinations for location data based, in part, on visible wireless access points. The device architecture 402 performs improved location estimation using wireless access point data.

In general, the device architecture 402 includes access point data receiver 404, location determination engine 406, location selection engine 408, location presentation engine 410, and storage device(s) 412. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

The access point data receiver 404 receives signals from one or more access points (e.g., WiFi access points). The signal can include, for example, an identification of the access point and details on whether or not the access point is encrypted. The access point data receiver 404 determines what access points are visible to the device based on which signals are received. The access point data receiver 404 can additionally determine a signal strength for each access point.

The location determination engine 406 can receive location data from various sources, e.g., the cellular towers 304 and GPS satellites 308 described above with reference to FIG. 3. The location determination engine 406 processes this data to determine candidate map locations corresponding to the location data. In this example, each candidate map location is a location on a road. In general, the location determination engine 406 generates an estimated location from the location data, e.g., as described above with reference to FIG. 3, and then selects one or more candidate map locations corresponding to the estimated location. For example, the location determination engine 406 can consider circles of expanding radius from the estimated location and identify candidate map locations where a circle intersects a road. The maximum radius the location determination engine 406 considers can be determined empirically, for example, from the estimated accuracy of the location data. The location determination engine 406 can also consider all map locations on roads within a minimum error of the estimated location, not just those on circles of given radii. The error can be, for example, the distance from the estimated location, or can be calculated from the factors considered by the location scoring engine 408, as described below. The location determination engine 406 can also divide each road that lies within a given geographic region (e.g., a circle centered at the estimated location) into discrete segments. For example, the location determination engine 406 can identify 5 meter segments of the roads. The location determination engine 406 then selects a candidate location within each of those segments—for example, at the center of the segments.

The location selection engine 408 selects one of the candidate map locations as the corrected map location for the device. The location selection engine 408 makes the selection based, at least in part, on a correspondence between the wireless access points visible to the device, and the wireless access points visible at each candidate map location. In some implementations, the location selection engine 408 makes the selection according to a score it determines for each candidate map location. The score for each candidate map location can reflect the probability that the candidate map location is the actual map location of the device.

In some implementations, the score for each candidate map location is a probability score that estimates the likelihood that the candidate map location is the actual map location, given the access points that are visible, and optionally the signal strength of each access point. The probability can be calculated, for example, by multiplying the probability that the candidate map location is the actual location given that individual access points are visible, and optionally the signal strength of each access point. For example, for candidate map location i, the probability P(i) can be calculated according to the following formula:

$$P(i) = P_i(V_1, R_1) \times P_i(V_2, R_2) \times \ldots \times P_i(V_n, R_n) \quad (1)$$

where $P_i(V_j, R_j)$ is the probability that at candidate location i, access point $V_j$ is visible with signal strength $R_j$.

The probability that a particular access point will be visible with a certain signal strength at a given location can derived uniquely for each access point. For example, the probability can be derived from distance the given location is from the access point. For example, it can be assumed that the received signal strength will weaken according to an inverse square relationship of distance from the access point, e.g., will weaken at the rate of:

$$\frac{1}{r^2}, \quad (2)$$

where r is the distance the given location is from the access point. Therefore, when the location of the access points is known, the probability function can estimate the probability of seeing a signal of the observed strength given this expected decline in signal strength.

When the location of the access points is not known, the location can be predicted, for example, using data associating GPS position fixes with signal strength for various wireless access points available at the locations corresponding to the GPS position fixes. This data can be gathered, for example, from contractors, or using crowd-sourcing techniques, where data collected by individuals is compiled into a collection of information. The estimated positions of the access points can be predicted from this data according to the inverse square relationship of observed signal strength, e.g., by identifying the most likely location for each access point given the GPS position fixes where the signal was perceived, and the likely distance the access point is from the position fixes as predicted according to the signal strength.

The probability can alternatively be predicted from a heat map generated from the crowd-sourced information. The heat map maps estimates what signal strength will be perceived at various proximities to the wireless access points. The probability that a given signal strength for a given wireless access point is received in the estimated location can then be derived from the heat map.

In other implementations, the score further reflects the probability that the candidate map location is the actual location, given what access points are not visible to the device. For example, for candidate map location i, the probability P(i) can be calculated according to the following formula:

$$P(i) = P_i(V_1, R_1) \times P_i(V_2, R_2) \times \ldots \times P_i(V_n, R_n) \times P_i(C_1) \times P_i(C_2) \times \ldots \times P_i(C_n), \quad (3)$$

where $P_i(C_j)$ is the probability that at candidate location i, access point $C_j$ is not visible.

In other implementations, the location selection engine 408 further bases the score on other factors. For example, the location selection engine 408 can use factors traditionally considered in snap-to-road calculations, including, but not limited to, the heading direction of the device and the direction of the road that each candidate map location is on, previous estimates of the device's map location, the current speed of the device and the expected speed for the road that each candidate map location is on, and the distance between the estimated map location and the candidate map location.

The location selection engine 408 compares the heading and road directions to determine if the device is likely traveling along the road. For example, if a candidate map location is on a road that runs north and south at the candidate map location, but the heading direction of the device is east, it is less likely that the device is traveling along the road. In contrast, if the road runs north and south at the candidate map location, and the heading direction of the device is north, it is more likely that the device is traveling along the road. In addition, if the road is a one way road, but the device is traveling in the wrong direction on the road, it is unlikely that the device is traveling along the road. The road direction can be determined, for example, from road vector data stored by the device.

The location selection engine 408 can also use previous estimates of map locations of the device to determine if it is likely that the device is moving along a road where the candidate map location is. For example, if the last three estimates of the device's position were on a given road, then it is more likely that a candidate map location on the given road is the actual map location. The location selection engine 408 compares the current speed of the device and the expected speed for the road that a given candidate map location is on to determine if the device is traveling at a speed that would indicate that it is traveling along the road. For example, if the device is traveling 70 miles per hour, and the expected speed for the road is 25 miles per hour, then it is less likely that the device is traveling along the road.

The speed of the device can be determined from the location data or from other sensors on the device, for example, an accelerometer. The expected speed of the road can be determined from a database of road speed limits, from the type of road (e.g., dirt roads have slower speeds than highways), or from data collected over time indicating the average speed of devices on the road. The distance between the estimated location and the candidate map location can be used to determine which candidate map locations are closest to the estimated location. Closer locations can be considered more likely candidates for the actual location.

In some implementations, the factors are included in the probability score calculation for a given candidate map location, for example, by calculating a probability that the candidate map location is the actual location given the factor. These probabilities can further be added to the probability calculation, for example, as follows:

$$P(i) = P_i(V_1, R_1) \times P_i(V_2, R_2) \times \ldots \times P_i(V_n, R_n) \times P_i(F_1) \times P_i(F_2) \times \ldots \times P_i(F_k), \quad (4)$$

Where $P(F_j)$ is the probability that the factor Fj would be observed at candidate map location i.

In some implementations, the probabilities for the factors are weighted, for example, according to the following formula:

$$P(i) = P_i(V_1, R_1) \times P_i(V_2, R_2) \times \ldots \times P_i(V_n, R_n) \times w_1 P_i(F_1) \times w_2 P_i(F_2) \times \ldots \times w_k P_i(F_k), \quad (5)$$

where $w_j$ is the weight for the jth factor. The weights can be determined, for example, empirically, to reflect the importance of the different factors.

In other implementations, the location selection engine 408 can generate an error for each candidate map location, the error indicating how unlikely it is that the candidate map location is the actual location, and can select the candidate map location with the minimum error. The error can be calculated, for example, using the same factors described above with respect to calculating the score.

In some implementations, the location selection engine 408 generates location scores (or errors) for each candidate map location using traditional snap-to-road techniques, and then weights each score or error by the probability that its corresponding candidate map location is the actual location. The probability can be based on the correspondence between the access points visible to the device and the access points visible at each candidate map location, and can optionally be further based on the signal strength of each access point. For example, the location selection engine 408 can weight the scores of the candidate map locations according to a probability derived according to equation (1), or equation (3), or equation 4 given above.

The location selection engine can also generate the scores for the candidate map locations using various statistical techniques, for example, Hidden Markov Models.

The location presentation engine 410 presents the selected candidate map location. In some implementations, the location presentation engine 410 presents the selected candidate map location to a user of the device through a map interface. The map interface can be, for example, the map interface 100 described above with reference to FIG. 1. In other implementations, the location presentation engine 410 presents the selected map location by sending the selected map location to another program running on the device. Example programs include, but are not limited to, a directions program that provides directions from the current location of the device, a camera program that tags pictures with the location where they were taken, and a restaurant finding program that finds restaurants in a vicinity of a device.

The storage devices 412 store data needed by the location determination engine 406 and the location selection engine 408. For example, the storage devices 412 can store data including, but not limited to, map vector data and road access point data. The map vector data includes road vectors for various roads. The road access point data identifies access points visible at various map locations along the roads, and optionally a signal strength of each access point at each location.

Example Processes

Figure 5:
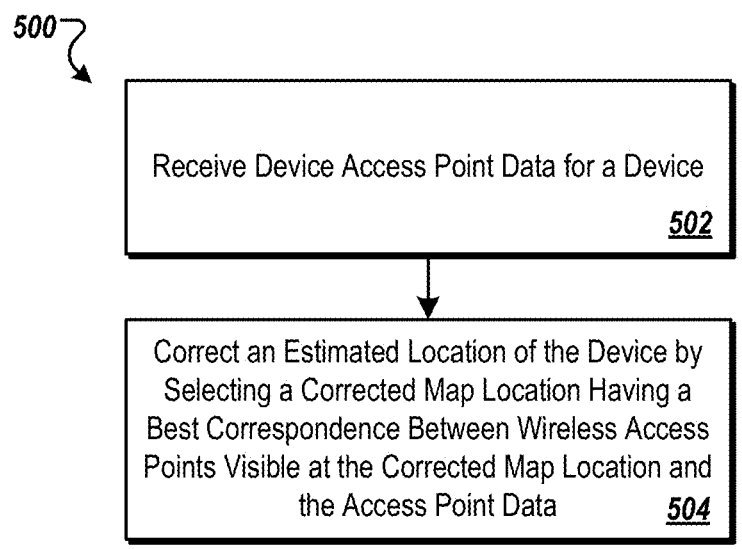
FIG. 5 is a flow diagram of an example process for receiving device access point data for a device and correcting a map location of the device using an improved snap-to-road process.

FIG. 5 is a flow diagram of example process 500 for receiving device access point data for a device and correcting an estimated location of the device using an improved snap-to-road process. For convenience, the example process 500 will be described in reference to a system that performs the process 500. The system can be, for example, the device architecture 402.

The system receives device access point data for a device (502), for example, as described above with reference to FIG. 4. The system corrects an estimated location of the device by selecting a corresponding corrected map location having a best correspondence between wireless access points visible at the candidate map location and the device access point data for the device (504), for example, as described above with reference to FIG. 4. The system can additionally consider other factors when selecting the corrected map location of the device, as described above with reference to FIG. 4.

Figure 6:
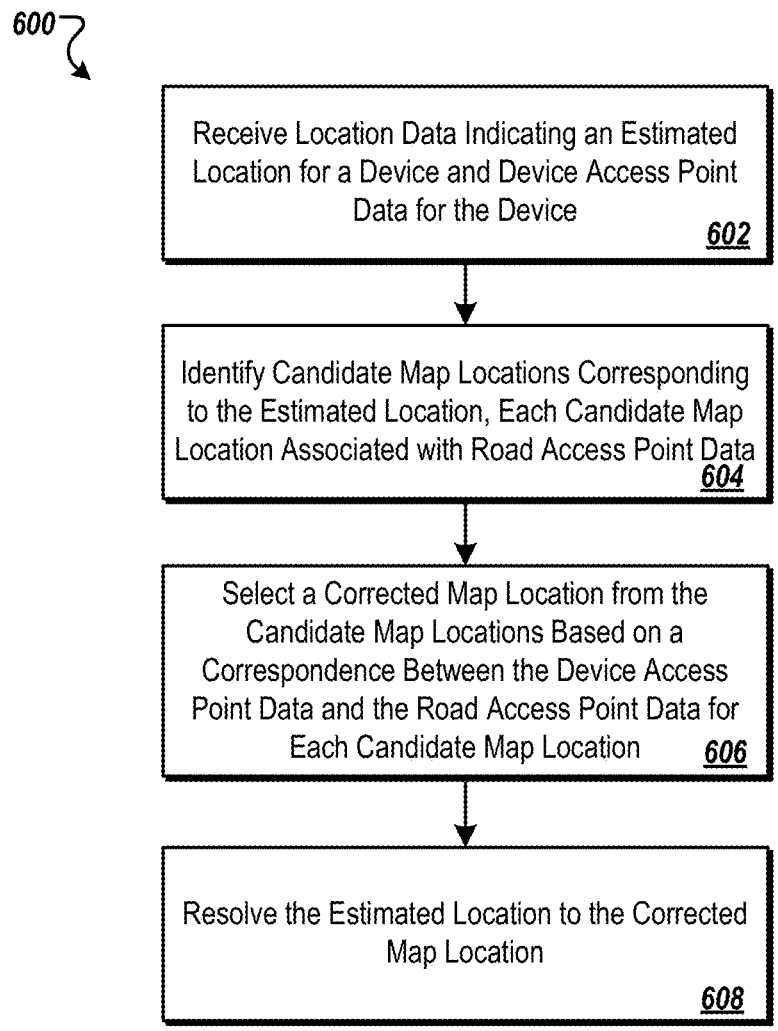
FIG. 6 is a flow diagram of example process for receiving location data indicating an estimated location of a device and resolving the estimated location to a corrected location

FIG. 6 is a flow diagram of example process 600 for receiving location data indicating an estimated location of a device and resolving the estimated location to a corrected location. For convenience, the example process 600 will be described in reference to a system that performs the process 600. The system can be, for example, the device architecture 402.

The system receives location data indicating an estimated location for a device and device access point data for the device (602). The location data can be used by the device to determine an estimated location for the device, for example, as described above with reference to FIG. 4. The access point data indicates what access points are visible to the device, and optionally a signal strength for each access point, for example, as described above with reference to FIG. 4.

The system identifies candidate map locations corresponding to the estimated location (604), for example, as described above with reference to FIG. 4. Each candidate map location is associated with road access point data indicating what access points are visible at each candidate map location, and optionally a signal strength for each access point, for example, as described above with reference to FIG. 4.

The system selects a corrected map location from the candidate map locations based on a correspondence between the device access point data and the road access point data for each candidate map location (606), for example, as described above with reference to FIG. 4.

The system resolves the estimated location to the corrected map location (608). The system resolves the estimated location to the corrected map location by using the corrected map location as the current location of the device. For example, the system can use the corrected map location as the current location of the device by presenting the corrected map location to a user or providing the corrected map location to another program running on the device, as described above with reference to FIG. 4.

A Priori Snap-to-Road Using Integrated Map Data and Access Point Data

Device Architecture

Figure 7:
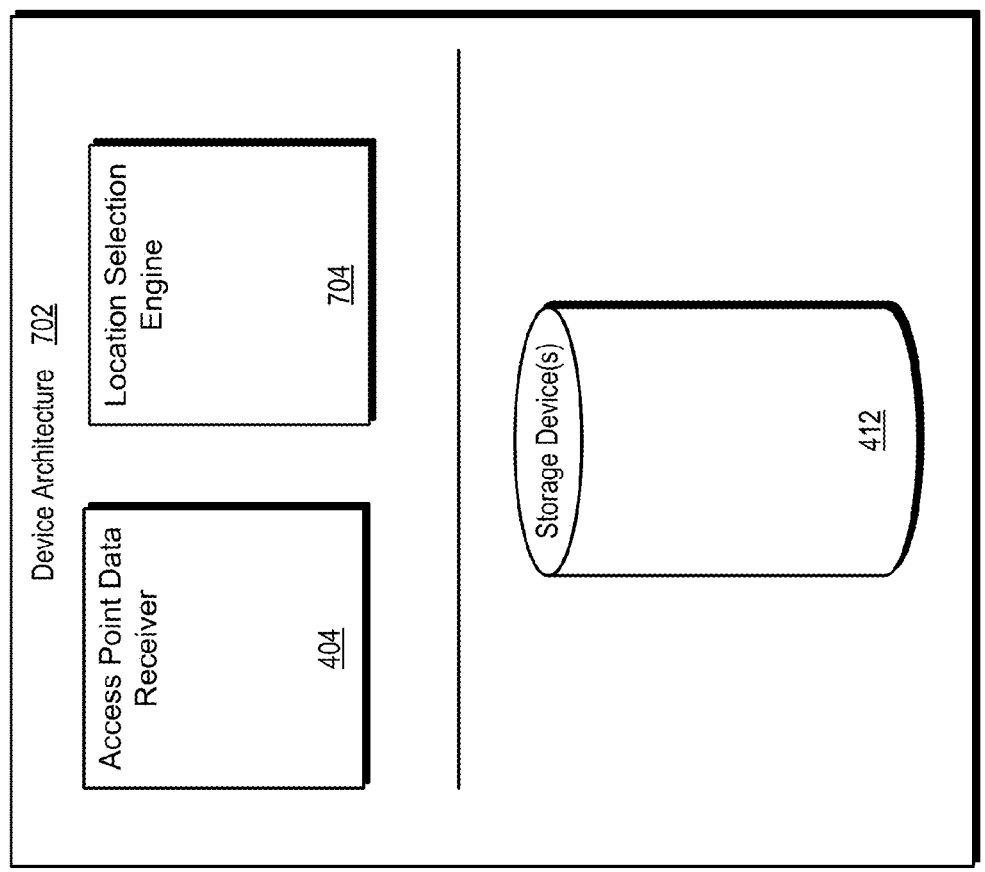
FIG. 7 illustrates an example device architecture for performing a priori snap-to-road calculations using integrated map data and road access point data.

FIG. 7 illustrates an example device architecture 702 for performing a priori snap-to-road calculations using integrated map data and road access point data. A priori snap-to-road calculations are performed in the absence of additional location data.

In general, the device architecture 702 includes access point data receiver 404, location selection engine 704, and storage device(s) 412. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

The access point data receiver 404 receives signals from access points and determines what access points are visible to the device at its current location (and optionally, a signal strength associated with each access point), as described above with reference to FIG. 4.

The location selection engine 704 selects a corrected map location for the device based on what access points are visible to the device. In general, the location selection engine 704 selects a candidate map location on a road that has good correspondence between the access points visible at the candidate map location, and optionally a signal strength for each access point, and the access points visible to the device. The location selection engine 704 can use various techniques to select the corrected map location for the device, some examples of which are given below.

For example, in some implementations, the location selection engine 704 selects the corrected map location by determining a score, or error, at each candidate map location in a group of candidate map locations and selecting the candidate map location with the best score, or lowest error. The location engine 704 can select the group of candidate map locations, for example, by considering a discrete number of locations within a bounded geographic region. The geographic region can be selected, for example, by estimating the location of the geographic device from the wireless access point data and selecting locations within a given radius of the location. The location can be determined, for example, by estimating the position of the device using centroid techniques or triangulation as described above with reference to FIG. 3. Alternatively, the location can be determined, for example, by selecting the location of an access point that is visible to the device, and using the location of the access point as the estimated location of the device. The radius can be selected to be the smallest possible radius that will encompass a threshold number of candidate locations.

As another example, in some implementations, the location selection selects the group of candidate map locations engine 704 by performing a directed search of the candidate map locations for which road access point data is available. For example, the location selection engine 704 can identify an important access point that is visible, or not visible, to the device. The fact that a particular access point is visible can be important when the access point has a small area of coverage, and the fact that a particular access point is not visible can be important when the access point has a large area of coverage. The location selection engine 704 can determine the importance of the presence or the absence of an access point from an analysis of how frequently access points are visible in the road data. For example, the location selection engine 704 can use the inverse frequency of candidate map locations where the an access point is visible as a measure of how important the access point's presence is. Similarly, the location selection engine 704 can use the inverse frequency of candidate map locations where an access point is not visible as a measure of how important the access point's absence is. Once the location selection engine 704 identifies an important access point, the location selection engine can identify a group of candidate map locations where the important access point is either visible, or not visible. This group can be further narrowed by other important access points, until a threshold number of map locations remain. In some implementations, the map locations are further filtered based on the signal strength of each access point. For example, if the signal strength observed by the device is strong, but the signal strength at a given map location is weak, the access point can be considered not visible at the given map location, because of the discrepancy in signal strengths.

The location selection engine 704 can determine the score and/or error based on the correspondence between visible access points at the candidate map locations and what access points are visible to the device, and can optionally be further based on the signal strength of the access points. In some implementations, the score and/or error is further based on one or more of the factors described above with reference to FIG. 4, other than those that require location data.

As another example, in some implementations, the location selection engine 704 searches the road access point data to determine if the road access point data for any candidate map location indicates that all of the access points visible to the device are also visible at the candidate map location. If so, the location selection engine 704 selects the from one of the candidate map locations where all of the access points are visible. The selection can be done, for example, based on a correspondence between signal strength in the road data and signal strength observed by the device, or based on a correspondence between access points that are not visible to the device and not visible at the candidate map locations.

If the location selection engine 704 determines that the access points are not all visible from any candidate map location, the location selection engine 704 can determine if a subset of the access points is visible from one or more candidate map locations, and continues to decrease the size of the subset until at least one matching candidate map location is found. The location selection engine 704 then selects from the found map locations, for example, as described above.

The storage device(s) 412 store data needed by the location selection engine 704. For example, the storage devices 412 can store data including, but not limited to, map vector data and road access point data, as described above with reference to FIG. 4.

Example Process

Figure 8:
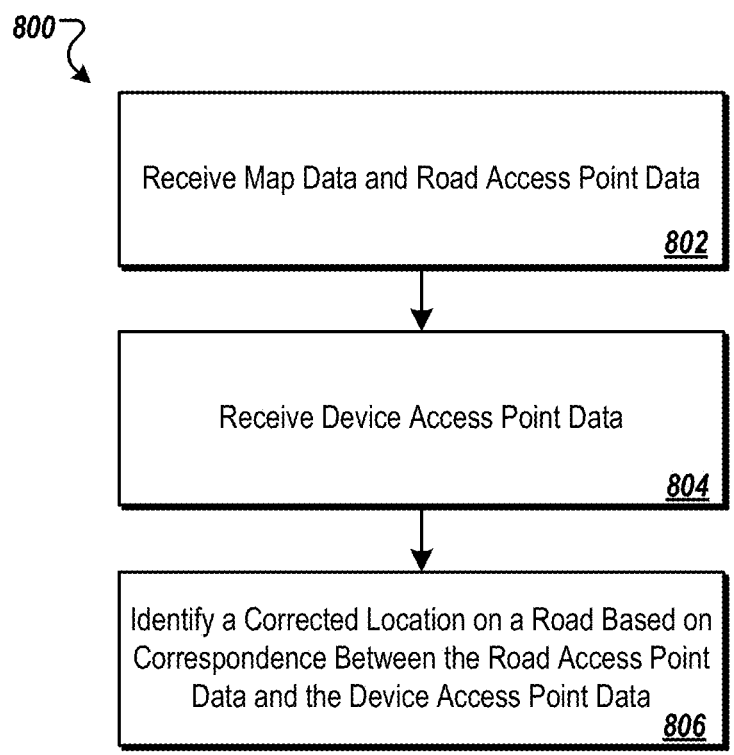
FIG. 8 is a flow diagram of example process for making an a priori snap-to-road determination.

FIG. 8 is a flow diagram of example process 800 for making an a priori snap-to-road determination. For convenience, the example process 800 will be described in reference to a system that performs the process 800. The system can be, for example, the device architecture 702. The system receives map data and road access point data (802). The system can receive the data, for example, from a storage device storing the data, as described above with reference to FIG. 7. The system receives device access point data (step 804), for example, as described above with reference to FIGS. 4 and 7. The system identifies a corrected map location on a road based on a correspondence between the device access point data and the road access point data (806), for example, as described above with reference to FIG. 7.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be coupled by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. For example, the modules described in reference to FIGS. 4 and 7 need not perform all, or any, of the functionality attributed to those modules in the implementations described above, and all or part of the functionality attributed to one module may be performed by another module, another additional module, or not performed at all. Accordingly, other implementations are within the scope of the following claims.

What is claimed is:

1. A computer-implemented method, comprising:
  receiving location data and device access point data for a device, the location data indicating an estimate of a current location of the device at a time and the device access point data identifying one or more wireless access points visible to the device at the time;
  based on the estimated current location of the device, identifying a plurality of candidate map locations, each candidate map location being on a road and associated with road access point data identifying one or more wireless access points visible at the candidate map location;
  determining a corrected map location from the plurality of candidate map locations as being a most likely location of the device based at least in part on a respective correspondence between the device access point data and the road access point data for each candidate map location; and
  correcting the estimated current location of the device at the time by using the corrected map location as the current location of the device.

2. The method of claim 1, where the access point data further includes a signal strength for each wireless access point visible to the device, and the road data further includes a signal strength for each wireless access point visible at the candidate map location.

3. The method of claim 1, where determining the corrected map location includes:
  calculating a score for each candidate map location, the score based in part on the correspondence between the device access point data and the road access point data; and
  selecting the corrected map location with a highest score as being the most likely location of the device.

4. The method of claim 3, where calculating the score for a particular candidate map location includes calculating a probability that, at the particular map location, a particular access point is visible with a particular signal strength.

5. The method of claim 3, where the score is a weighted score, and calculating the weighted score includes:
  associating a probability with each candidate map location, the probability indicating a likelihood that the candidate map location is an accurate location of the device, the probability determined based on access points visible at the candidate map location and signal strengths of the visible access points;
  determining a location score for each candidate map location, the location score corresponding to a correspondence between the location data and map data describing, for each candidate map location, a road that the candidate map location is on; and
  weighting location scores for the candidate map locations by the probability associated with each candidate map location.

6. The method of claim 1, where the location data is GPS data or cellular network data.

7. The method of claim 1, where the device is a mobile device.

8. The method of claim 1, where identifying a plurality of candidate map locations corresponding to the estimated current location includes identifying candidate map locations on known roads, each candidate map location having an estimated error that is less than a threshold amount of error.

9. The method of claim 1, wherein correcting the estimated current location includes presenting the corrected map location as a current location of the device.

10. The method of claim 1, wherein resolving the estimated current location includes providing the corrected map location as a current location of the device to a process running on the device.

11. A computer-readable medium having instructions stored thereon, which, when executed by a processor, causes the processor to perform operations comprising:
  receiving location data and device access point data for a device, the location data indicating an estimate of a current location of the device at a time and the device access point data identifying one or more wireless access points visible to the device at the time;
  based on the estimated current location of the device, identifying a plurality of candidate map locations, each candidate map location being on a road and associated with road access point data identifying one or more wireless access points visible at the candidate map location;
  determining a corrected map location from the plurality of candidate map locations as being a most likely location of the device based at least in part on a respective correspondence between the device access point data and the road access point data for each candidate map location; and correcting the estimated current location of the device at the time by using the corrected map location as the current location of the device.

12. The computer-readable medium of claim 11, where the access point data further includes a signal strength for each wireless access point visible to the device, and the road data further includes a signal strength for each wireless access point visible at the candidate map location.

13. A system comprising:
a processor;
a display device;
one or more storage devices; and
a computer readable medium coupled to the processor and including instructions, which, when executed by the processor, causes the processor to perform operations comprising:
receiving location data and device access point data for a device, the location data indicating an estimate of a current location of the device at a time and the device access point data identifying one or more wireless access points visible to the device at the time;
based on the estimated current location of the device, identifying a plurality of candidate map locations, each candidate map location being on a road and associated with road access point data identifying one or more wireless access points visible at the candidate map location;
determining a corrected map location from the plurality of candidate map locations as being a most likely location of the device based at least in part on a respective correspondence between the device access point data and the road access point data for each candidate map location; and
correcting the estimated current location of the device at the time by using the corrected map location as the current location of the device.

14. The system of claim 13, where the access point data further includes a signal strength for each wireless access point visible to the device, and the road data further includes a signal strength for each wireless access point visible at the candidate map location.

15. The method of claim 1, wherein each of the plurality of candidate map locations corresponding to the estimated current location is an location that is on the road and that is adjacent to the estimated current location.

16. The method of claim 15, wherein identifying a candidate map location comprises:
identifying a circle centered at the estimated current location; and
determining a location at which the circle intersects with the road.

17. The medium of claim 11, wherein each of the plurality of candidate map locations corresponding to the estimated current location is an location that is on the road and that is adjacent to the estimated current location.

18. The medium of claim 17, wherein identifying a candidate map location comprises:
identifying a circle centered at the estimated current location; and
determining a location at which the circle intersects with the road.

* * * * *